US012665204B2

(12) United States Patent
Lee et al.

(10) Patent No.: US 12,665,204 B2
(45) Date of Patent: Jun. 23, 2026

(54) METHOD OF MANUFACTURING NANOLAYERED CATHODES FOR SOLID OXIDE FUEL CELL USING ULTRASONIC SPRAY INFILTRATION AND SOLID OXIDE FUEL CELL MANUFACTURED USING SAME

(71) Applicant: KOREA INSTITUTE OF ENERGY RESEARCH, Daejeon (KR)

(72) Inventors: Seung Bok Lee, Daejeon (KR); Rak Hyun Song, Seoul (KR); Seok Joo Park, Daejeon (KR); Tak Hyoung Lim, Daejeon (KR); Jong Eun Hong, Daejeon (KR); Dong Woo Joh, Sejong-si (KR); Hye Sung Kim, Daejeon (KR); Saeed Ur Rehman, Cheongju-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 635 days.

(21) Appl. No.: 18/112,600

(22) Filed: Feb. 22, 2023

(65) Prior Publication Data

US 2023/0420691 A1     Dec. 28, 2023

(30) Foreign Application Priority Data

Jun. 23, 2022     (KR) ........................ 10-2022-0077092

(51) Int. Cl.
H01M 4/90          (2006.01)
H01M 4/88          (2006.01)
(Continued)

(52) U.S. Cl.
CPC ....... H01M 4/9075 (2013.01); H01M 4/8825 (2013.01); H01M 4/886 (2013.01);
(Continued)

(58) Field of Classification Search
CPC ...... H01M 4/886; H01M 4/9033; H01M 8/12; H01M 8/1246; H01M 8/1253; H01M 8/126
See application file for complete search history.

(56) References Cited

U.S. PATENT DOCUMENTS 8,802,316 B1 *   8/2014  Liu ..................... H01M 4/8889
                                                        429/479
2012/0270139 A1 *  10/2012  Park ........................ C04B 35/50
                                                        252/182.1
(Continued)

FOREIGN PATENT DOCUMENTS

KR       10-2012-0123639 A     11/2012
KR       10-2021-0017636 A      2/2021

OTHER PUBLICATIONS

Lee (KR 2021/0017636) Machine Translation (Year: 2021).*
(Continued)

*Primary Examiner* — Jeremiah R Smith

(74) *Attorney, Agent, or Firm* — Birch, Stewart, Kolasch & Birch, LLP

(57)          ABSTRACT

Disclosed is a method of manufacturing a cathode for a solid oxide fuel cell (SOFC) including preparing an electrode composition containing urea, ultrasonically spraying the electrode composition onto a GDC scaffold, and drying the scaffold.

By using urea, calcination ($\geq 700°$ C.) after each infiltration cycle can be omitted, the next infiltration cycle is performed immediately after the drying ($\leq 100°$ C.), and thus the cathode manufacturing process time can be greatly reduced. Disclosed is also a solid oxide fuel cell including an anode support, an anode functional layer disposed on the anode support, an electrolyte disposed on the anode functional (Continued)

layer, and a cathode disposed on the electrolyte, wherein the cathode is formed by ultrasonic spraying using an electrode composition containing urea.

7 Claims, 6 Drawing Sheets

(51) Int. Cl.

| | |
|---|---|
| *H01M 8/1226* | (2016.01) |
| *H01M 8/12* | (2016.01) |
| *H01M 8/1253* | (2016.01) |
| *H01M 8/126* | (2016.01) |

(52) U.S. Cl.
CPC ....... *H01M 4/9033* (2013.01); *H01M 8/1226* (2013.01); *H01M 8/1253* (2013.01); *H01M 8/126* (2013.01); *H01M 2008/1293* (2013.01)

(56) References Cited

U.S. PATENT DOCUMENTS

| | | | |
|---|---|---|---|
| 2014/0121097 A1* | 5/2014 | Phillips | B01J 37/16 |
| | | | 502/325 |
| 2019/0097243 A1* | 3/2019 | Abdul Jabbar | C01G 37/14 |
| 2024/0128472 A1* | 4/2024 | Borchtchoukova | |
| | | | H01M 4/8846 |
| 2025/0062378 A1* | 2/2025 | Wachsman | C25B 11/077 |

OTHER PUBLICATIONS

Korean Office Action for Korean Application No. 10-2022-0077092, dated Oct. 21, 2024.
Rehman et al., "A dynamic infiltration technique to synthesize nanolayered cathodes for high performance and robust solid oxide fuel cells," Journal of Energy Chemistry, vol. 70, 2022, pp. 201-210.
Korean Office Action for Korean Application No. 10-2022-0077092, dated Jun. 23, 2025.

* cited by examiner

1

METHOD OF MANUFACTURING NANOLAYERED CATHODES FOR SOLID OXIDE FUEL CELL USING ULTRASONIC SPRAY INFILTRATION AND SOLID OXIDE FUEL CELL MANUFACTURED USING SAME

CROSS-REFERENCE TO RELATED APPLICATION

THIS PRESENT APPLICATION CLAIMS THE BENEFIT OF PRIORITY TO KOREAN PATENT APPLICATION NO. 10-2022-0077092, ENTITLED "METHOD OF MANUFACTURING NANOLAYERED CATHODES FOR SOLID OXIDE FUEL CELL USING ULTRASONIC SPRAY INFILTRATION AND SOLID OXIDE FUEL CELL MANUFACTURED USING SAME" FILED ON Jun. 23, 2022, IN THE KOREAN INTELLECTUAL PROPERTY OFFICE, THE ENTIRE DISCLOSURE OF WHICH IS INCORPORATED HEREIN BY REFERENCE.

BACKGROUND OF THE INVENTION

Field of the Invention

Embodiments of the present invention relate to a method of manufacturing a cathode for a solid oxide fuel cell using ultrasonic spraying and a solid oxide fuel cell manufactured using the method. More specifically, embodiments of the present invention relate to a method of manufacturing a cathode capable of obviating various high-temperature heat treatment processes and a solid oxide fuel cell manufactured using the same.

Description of the Related Art

A solid oxide fuel cell (SOFC) is a clean power generation device that generates electricity and water as a by-product through an electrochemical reaction between fuel and air (oxygen) at a high temperature of 700° C. to 900° C. using a solid oxygen ion conductive ceramic as an electrolyte. High-temperature solid electrochemical devices based on ceramic membranes such as solid oxide fuel cells (SOFCs) and solid oxide electrolytic cells (SOECs) represent next-generation energy technologies for clean power generation and large-scale energy storage.

The SOFC generates electric energy using an electrolyte through a chemical reaction in which hydrogen ($H_2$) bonds to oxygen ($O_2$) to produce water ($H_2O$), and is capable of continuously generating electricity as long as fuel is supplied. SOFC includes an electrolyte capable of conducing oxygen ions and an anode and a cathode at both surfaces of the electrolyte. The SOFC operates based on the mechanism as follows. When fuel is supplied to the anode, the fuel is oxidized to discharge electrons through the external circuit, and when oxygen is supplied to the cathode, electrons are supplied from the external circuit and then reduced to oxygen ions. The reduced oxygen ions move to the anode through the electrolyte and react with oxidized hydrogen ions to produce water. At this time, electricity is generated by the flow of electrons from the anode to the cathode. The anode, the cathode, and the electrolyte, which are key components of the SOFC, require various conditions depending on the roles thereof.

The anode (referred to as "fuel electrode") should have a porous microstructure and high electrical and ionic conductivity in order to facilitate fuel diffusion and oxidation reaction. In addition, in order to secure the mechanical stability of the multilayered fuel cell, the anode should have a thermal expansion coefficient similar to the surrounding component and ensure chemical and phase stability in oxidizing and reducing atmospheres. The large difference in thermal expansion rate may cause serious problems such as microcracks and delamination during the manufacturing process or operation. The material used for the anode should have excellent catalytic properties to increase electrochemical activity and should have excellent activity in reforming reactions to secure smooth use of fuels. In addition, the anode should be highly resistant to impurity contamination due to the reforming reaction. In addition, a sufficient amount of triple phase boundary (TPB) should exist in order for the electrochemical reaction of the fuel to proceed smoothly, and the porosity should be controlled to an appropriate level in order to secure smooth discharge of the reaction product and maintain the mechanical properties of the anode.

The main function of the electrolyte is to transfer ions between the cathode and the anode, and separate the fuels from oxygen. Therefore, the electrolyte should be formed of a dense membrane in order to prevent the oxidizing agent from directly reacting with the fuels, should ensure chemical and phase stability under oxidizing and reducing atmospheres, should not be permeable to reactive gases, and have high ionic conductivity under operating conditions. Since SOFCs operate at high temperatures, the electrolyte should be chemically and thermally stable with surrounding components within the range from room temperature to operating temperature and even at higher temperatures at which fuel cells are manufactured. The thermal expansion of the electrolyte should be similar to that of the surrounding component in order to prevent cracking and delamination during manufacture and thermal cycle operation. In addition, the coefficient of thermal expansion of the electrolyte should remain unchanged despite changes in the oxygen partial pressure of the anode and the cathode during operation, and the electrolyte should be selected as a basic material and other battery materials should be selected in consideration of the thermal expansion characteristics.

The cathode (also referred to as "air electrode") should have a porous microstructure to facilitate the diffusion of oxygen and should have high electronic and ionic conductivity to minimize the reduction in electricity due to the resistance present in the electrode material itself. In addition, the cathode should have low polarization resistance to the reduction reaction of oxygen and excellent chemical and phase stability under oxidizing and reducing atmospheres. In addition, the material for the cathode should be capable of continuously maintaining a single phase within the range from room temperature to the operating temperature. The cathode should have no interfacial reaction with the electrolyte at the SOFC operating temperature. The interfacial reaction with an electrolyte causes formation of a compound having low oxygen ion conductivity. Therefore, the interfacial reaction has a fatal effect on the long-term stability of the operating performance of the solid oxide fuel cell. The unit cell constituting the SOFC is composed of an assembly of an electrolyte, electrodes and connectors, and the surrounding components should have a similar coefficient of thermal expansion during bonding or heat treatment to obtain operating conditions.

Commercial SOFCs use LSM/YSZ, YSZ, and NiO/YSZ as materials for the cathode, the electrolyte, and the anode, respectively, and mainly require high operating temperatures (800 to 1,000° C.) to output adequate performance due to the slow oxygen reduction reaction (ORR) kinetics of LSM.

Therefore, lowering the operating temperature (<800° C.) is essential for the commercialization of SOFC. Cobalt-containing perovskites such as $Sm_{0.5}Sr_{0.5}CoO_{3-\delta}$ (SSC), $La_xSr_{1-x}CoyFe_{1-y}O_{3-\delta}$ (LSCF), and $Ba_{0.5}Sr_{0.5}CoO_8Fe_{0.2}O_3\delta$ (BSCF) as materials to replace conventional LSMs exhibited potential performance due to mixed ion-electron conductor (MIEC) behavior within the low (<600° C.) to moderate (600 to 800° C.) operating temperature range. However, these highly active cathode materials are inapplicable to conventional screen printing and sintering processes due to high reactivity to zirconia-based electrolytes and high thermal expansion coefficients thereof. To solve this problem, a gadolinium-doped ceria (GDC) anti-diffusion layer was additionally laminated by screen printing and sintering to avoid unwanted reactions and minimize the effect of thermal expansion mismatch.

However, a process of producing the GDC layer itself is very difficult due to poor sinterability and tendency to form $(Zr,Ce)O_2$ solid solution at the sintering temperatures required to achieve densification. In addition, the presence of the GDC buffer layer disadvantageously increases the total ohmic resistance of the SOFC.

Meanwhile, the nanostructure is applicable to the cathode of SOFC due to the advantages of low synthesis temperature and extended three-phase interface (TPB). In particular, infiltration receives a great deal of attention as a method to provide surface modification and manufacturing of nano-structured cathodes. The manufacturing of cathodes by infiltration has advantages of obtaining the desired electrical properties based on much lower amounts of loaded catalysts. In addition, a catalyst having a high coefficient of thermal expansion may be used since thermal expansion can be controlled by the backbone of the electrolyte or the cathode.

However, despite these advantages, there is a problem in that the amount of catalyst loaded per infiltration step, which is determined by the concentration and volume of the precursor solution that can be infiltrated in a single step, is limited in the process of manufacturing a SOFC cathode. As a result, there is a need for multiple infiltration and high temperature firing cycles to achieve the required catalyst loading.

SUMMARY OF THE INVENTION

Therefore, the present invention has been made in view of the above problems, and it is one object of the present invention to provide a method of manufacturing a cathode for a solid oxide fuel cell using ultrasonic spraying that is capable of forming the cathode within a short time through simple heat treatment and a solid oxide fuel cell manufactured using the same.

Also, it is another object of the present invention to provide a solid oxide fuel cell having long-term durability without a GDC buffer layer.

In accordance with the present invention, the above and other objects can be accomplished by the provision of a method of manufacturing a cathode for a solid oxide fuel cell (SOFC) including preparing an electrode composition containing urea, ultrasonically spraying the electrode composition onto a GDC scaffold, and drying the scaffold.

In accordance with another aspect of the present invention, provided is a solid oxide fuel cell including an anode support, an anode functional layer disposed on the anode support, an electrolyte disposed on the anode functional layer, and a cathode disposed on the electrolyte, wherein the cathode is formed by ultrasonic spraying using an electrode composition containing urea.

BRIEF DESCRIPTION OF THE DRAWINGS

The above and other objects, features and other advantages of the present invention will be more clearly understood from the following detailed description taken in conjunction with the accompanying drawings, in which:

FIG. 1A is a schematic diagram illustrating infiltration of a LSCF precursor solution into a ScCeSZ scaffold segment and FIG. 1B is a schematic diagram illustrating infiltration of a LSCF precursor solution into a GDC scaffold;

FIG. 6A shows the current-voltage (I-V) and current-power (I-P) plots of SOFC segments according to Examples, FIGS. 6B and 6C are graphs illustrating electrochemical impedance spectroscopy (EIS) data as Nyquist and Bode plots, respectively, and FIG. 6D shows the result of stability test of Cell-5 operating at a constant current load of 500 mAcm$^{-2}$ and an operating temperature of 700° C.; FIG. 7A is a polarization curve, FIGS. 7B and 7C are Nyquist and Bode plots obtained at operating temperatures of 700 and 750° C., FIG. 7D shows the result of stability test of Cell-5 operating at a constant current load of 500 mAcm$^{-2}$ and an operating temperature of 700° C., and FIG. 7E is an SEM image illustrating the nanolayer LSCF cathode before and after the stability test.

DETAILED DESCRIPTION OF THE INVENTION

Figure 1:
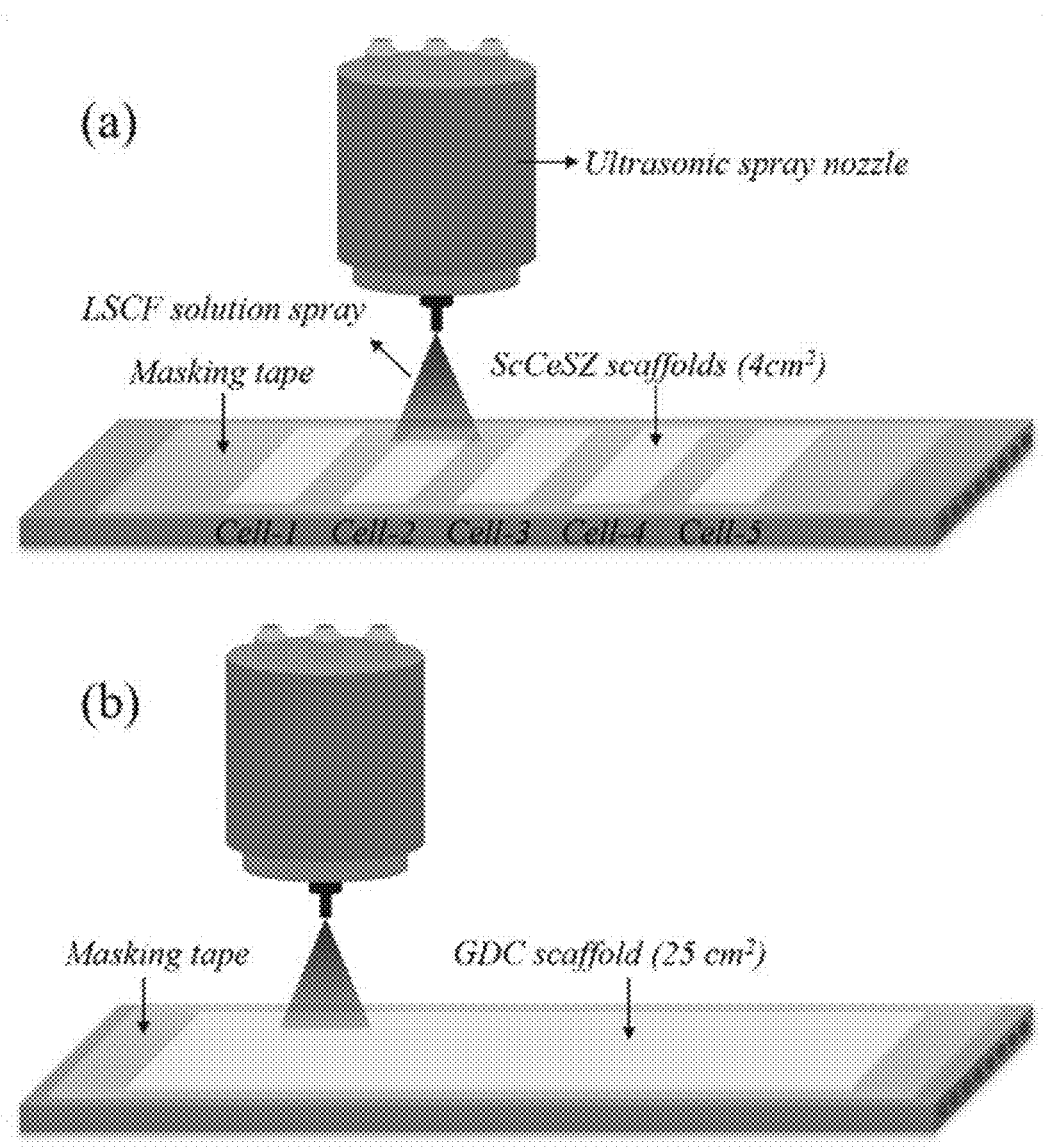
FIG. 1 is a schematic diagram illustrating a method of manufacturing a cathode for a solid oxide fuel cell of the present invention, more specifically.

Hereinafter, various embodiments of the present invention will be described with reference to the accompanying drawings. Embodiments and terms used herein are not intended to limit the technology described herein to specific embodiments and should be construed to include various modifications, equivalents, and/or substitutes of the embodiments.

The method of forming a cathode for a solid oxide fuel cell (SOFC) according to the present invention may include preparing an electrode composition containing urea, ultrasonically spraying the electrode composition onto a GDC scaffold, and drying the scaffold.

In the cathode formation method of the present invention, the LSCF nanolayer may be coated by infiltration of the LSCF precursor by ultrasonic spraying using urea.

Specifically, in the step of preparing the electrode composition, an electrode composition including urea and a precursor of $La_{0.6}Sr_{0.4}Co_{0.2}Fe_{0.8}O_3$(LSCF) may be prepared. Urea can act as a complexing agent to form a perovskite phase and homogenize the precipitate composition.

In this case, the LSCF precursor may be metal nitrate. That is, the metal nitrate may be a nitrate based on La, Sr, Co, or Fe. Specifically, the LSCF precursor may include $La(NO_3)_3 \cdot 6H_2O$, $Sr(NO_3)_2$, $Co(NO_3)_2 \cdot 6H_2O$, and $Fe(NO_3)_3 \cdot 9H_2O$. In this case, a molar ratio of urea to metal is 5:1 to 15:1.

The electrode composition may further include distilled water and ethanol.

Next, the electrode composition may be ultrasonically sprayed onto the scaffold. For example, the electrode composition may be ultrasonically sprayed onto the GDC scaffold. The ultrasonic spraying causes infiltration based on ultrasonic spraying.

In this case, the ultrasonic spraying preferably uses an ultrasonicator including a controller, an ultrasonic spray nozzle, a frequency controller, an air flow meter, and a syringe pump.

The ultrasonic spraying is preferably performed under the conditions of an ultrasonic driving frequency of 75 to 85 kHz, a syringe pump flow rate of 2 to 4 µl/min, and an air flow rate of 2 to 4 L/min, but is not limited to the conditions.

In the ultrasonic spraying, urea can act as a precipitating agent. Specifically, urea hydrolysis enables deposition of precursor metals as hydroxide and hydroxy-carbonate precipitates at temperatures lower than 100° C., thus avoiding calcination at high-temperature (≥700° C.).

The infiltration is preferably performed 1 to 7 times, more preferably 3 to 5 times.

Next, the drying may be performed after each infiltration cycle. The drying is performed at a low temperature of less than 100° C.

Finally, after completion of the infiltration, the result may be calcined at 800 to 900° C. for 2 to 3 hours.

The use of urea as a precipitating agent in the present invention enables calcination (≥700° C.) after each infiltration cycle to be omitted and the next infiltration cycle to be performed immediately after the drying (≤100° C.). The precipitate may be converted to the desired catalytic phase in single calcination, enabling much faster production of nanostructured cathodes. In addition, an SOFC having excellent durability and performance can be manufactured due to the low calcination temperature (≤900° C.) without using a $Ce_{0.9}Gd_{0.1}O_2$(GDC) diffusion barrier layer.

Hereinafter, the solid oxide fuel cell according to the present invention will be described in detail. The solid oxide fuel cell according to the present invention may include an anode support, an anode functional layer disposed on the anode support, an electrolyte disposed on the anode functional layer, and a cathode disposed on the electrolyte.

In this case, in the solid oxide fuel cell of the present invention, the buffer layer disposed between the electrolyte and the cathode may be omitted. Specifically, a $Ce_{0.9}Gd_{0.1}O_2$ (GDC) buffer layer, which is widely used as a diffusion barrier between the electrolyte and the cathode, may be omitted.

The cathode may include a GDC scaffold and an LSCF nanolayer disposed on the GDC scaffold. In this case, the LSCF layer may be formed by ultrasonic spraying using an electrode composition containing urea.

The solid oxide fuel cell of the present invention can exhibit excellent durability and performance without using a $Ce_{0.9}Gd_{0.1}O_2$(GDC) diffusion barrier layer.

Hereinafter, the present invention will be described in more detail with reference to examples. The examples are provided only for illustration of the present invention, and should not be construed as limiting the scope of the present invention.

Example 1: Manufacture of Solid Oxide Fuel Cell

In order to evaluate the electrochemical performance of the LSCF cathode synthesized by ultrasonic spray infiltration using urea, flat tubular anode-supported SOFCs were fabricated. First, a porous fuel electrode was produced. To this end, NiO (J.T. Baker), $Y_{0.08}Zr_{0.92}O_2$ (8YSZ; LTC, South Korea), and graphite (pore former) powder were well mixed, and ethanol and zirconia balls were added to the mixed powder, followed by uniformly dispersion by ball milling. A mixture of NiO, 8YSZ, and graphite powder was kneaded using distilled water, an organic binder, and a plasticizer, and then a flat tubular anode support was extruded. Then, the extruded anode support was dried in a humidity-controlled oven and preliminarily sintered at 1,100° C. for 3 hours.

The anode support was coated with an anode functional layer (AFL) containing 60 wt % NiO and 40 wt % $Sc_{0.10}Ce_{0.01}Zr_{0.89}O_2$ (ScCeSZ; fuel cell materials, USA) using dip coating and then sintered at 1,000° C. for 3 hours. Subsequently, the result was further coated with the ScCeSZ electrolyte using dip coating. The anode support having the AFL and the electrolyte assembly were co-sintered at 1,400° C. for 5 hours in air to obtain a flat-tubular anode-supported half-cell.

Porous scaffolds of ScCeSZ and GDC were formed on the cell to synthesize LSCF cathodes through ultrasonic infiltration. Two different scaffold materials were used to determine the effects of the scaffold materials on the performance and stability of the LSCF cathode. To this end, an ink paste containing 70 wt % ScCeSZ/GDC and 30 wt % PMMA (5 µm, Sunjin, Korea) pore former powder was screen-printed on the ScCeSZ electrolyte in the flat tubular cell and sintered at 1,250° C. for 3 hours.

Initially, to determine the microstructure and performance of the infiltrated LSCF cathode, the ScCeSZ scaffolds were produced as five segments in the flat tubular cell as shown in FIG. 1. However, the ScCeSZ scaffold was found to be inadequate to achieve durability.

Therefore, a GDC scaffold that has an active area of 25 $cm^2$ and exhibits higher chemical compatibility with the SOFC cathode material was used. Based thereon, the scalability of ultrasonic spray infiltration using urea and the durability of the SOFC having nanolayer LSCF, but having no GDC buffer layer, were determined.

Example 2: Production of LSCF Electrode

In order to prepare the LSCF infiltration solution, $La(NO_3)_3 \cdot 6H_2O$, $Sr(NO_3)_2$, $Co(NO_3)_2 \cdot 6H_2O$, $Fe(NO_3)_3 \cdot 9H_2O$ and urea from Sigma Aldrich were prepared. A stoichiometric amount of metal nitrate salt was dissolved in a solvent containing 27.5 ml of D.I. and 22.5 ml of ethanol. Then, the urea was dissolved in the metal nitrate solution in an amount satisfying the molar ratio (10:1) of urea to metal.

The LSCF solution was infiltrated in the ScCeSZ scaffold by ultrasonic spraying using an ultrasonic spray infiltrator. Before infiltration, tape masking was performed to expose only the scaffold to the infiltration solution thereby to prevent the creation of additional active cathode regions. ScCeSZ scaffolds were infiltrated through 1, 2, 3, 4 and 5 infiltration cycles and intermediate drying was performed at 100° C. As shown in FIG. 1A, ScCeSZ scaffolds are referred to as "Cell-1", "Cell-2", "Cell-3", "Cell-4" and "Cell-5", respectively. The infiltrated scaffolds were calcined at 900° C. for 1 hour only after the last infiltration cycle to form the LSCF perovskite phase.

Similarly, referring to FIG. 1B, the nanolayer LSCF cathode was produced through ultrasonic spray infiltration using urea for 5 infiltration cycles using a GDC scaffold having an active area of 25 cm².

Figure 2:
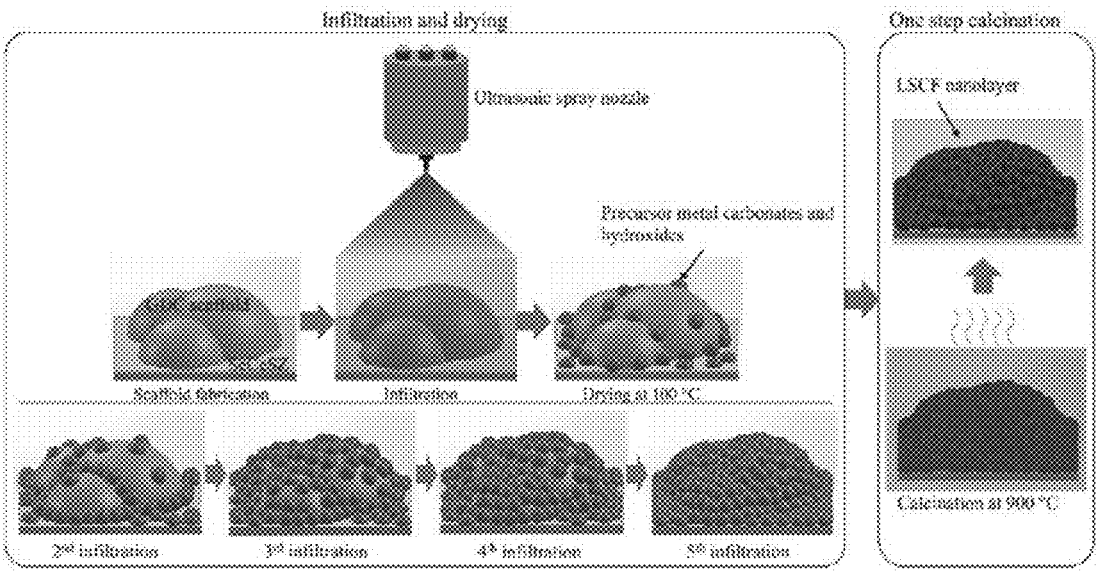
FIG. 2 is a schematic diagram illustrating an LSCF nanolayer cathode synthesis process.

FIG. 2 is a schematic diagram illustrating ultrasonic spray infiltration using urea. The LSCF precursor solution was infiltrated using an ultrasonic spray nozzle on the porous ScCeSZ and GDC scaffolds and then dried at 100° C. After 5 infiltration cycles, the result was calcined at 900° C. to obtain LSCF perovskite nanolayers.

Figure 3:
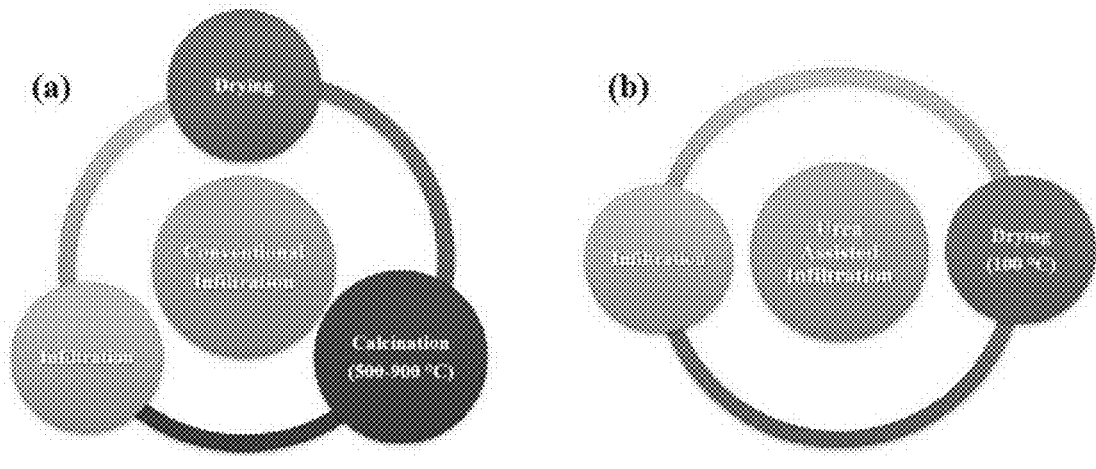
FIG. 3 illustrates the conceptual comparison between a conventional infiltration method and an infiltration method according to the present invention.

Referring to FIG. 3A, a single infiltration cycle generally includes infiltration, drying and calcination (700 to 900° C.) due to the high solubility of the precursor nitrate. Therefore, multiple infiltration cycles are required to achieve adequate catalyst loading. However, in the present invention, urea was used as a precipitating agent. Urea hydrolysis induces deposition of precursor metals as hydroxide and hydroxy-carbonate precipitates at temperatures lower than 100° C., thus eliminating calcination at high temperatures (≥700° C.). In order to ensure the uniformity and reproducibility of the infiltration solution, uniform generation of precipitates in the infiltration solution is indispensable. In order to control the uniform formation of cationic precipitates, ligands (e.g., OH—, $CO_3^{2-}$, $SO_4^{2-}$) should be slowly released into the solution until the solubility limit is obtained. Urea hydrolysis proceeds as depicted in Equation (1) below and can be satisfied by steadily releasing ammonia and carbon dioxide into the solution.

$$CO(H_2N)_2 + 3H_2O \rightarrow 2NH_4^+ + HCO_3^- + OH^- \qquad (1)$$

Urea hydrolysis provides low supersaturation, allowing homogeneous formation and growth of precipitates throughout the solution. Therefore, as shown in FIG. 3B, when urea is used as a precipitating agent, drying at a low temperature (≤100° C.) can be used instead of calcination at a high temperature during a single infiltration cycle to achieve the desired catalyst loading.

Experimental Example 1: XRD Analysis

Figure 4:
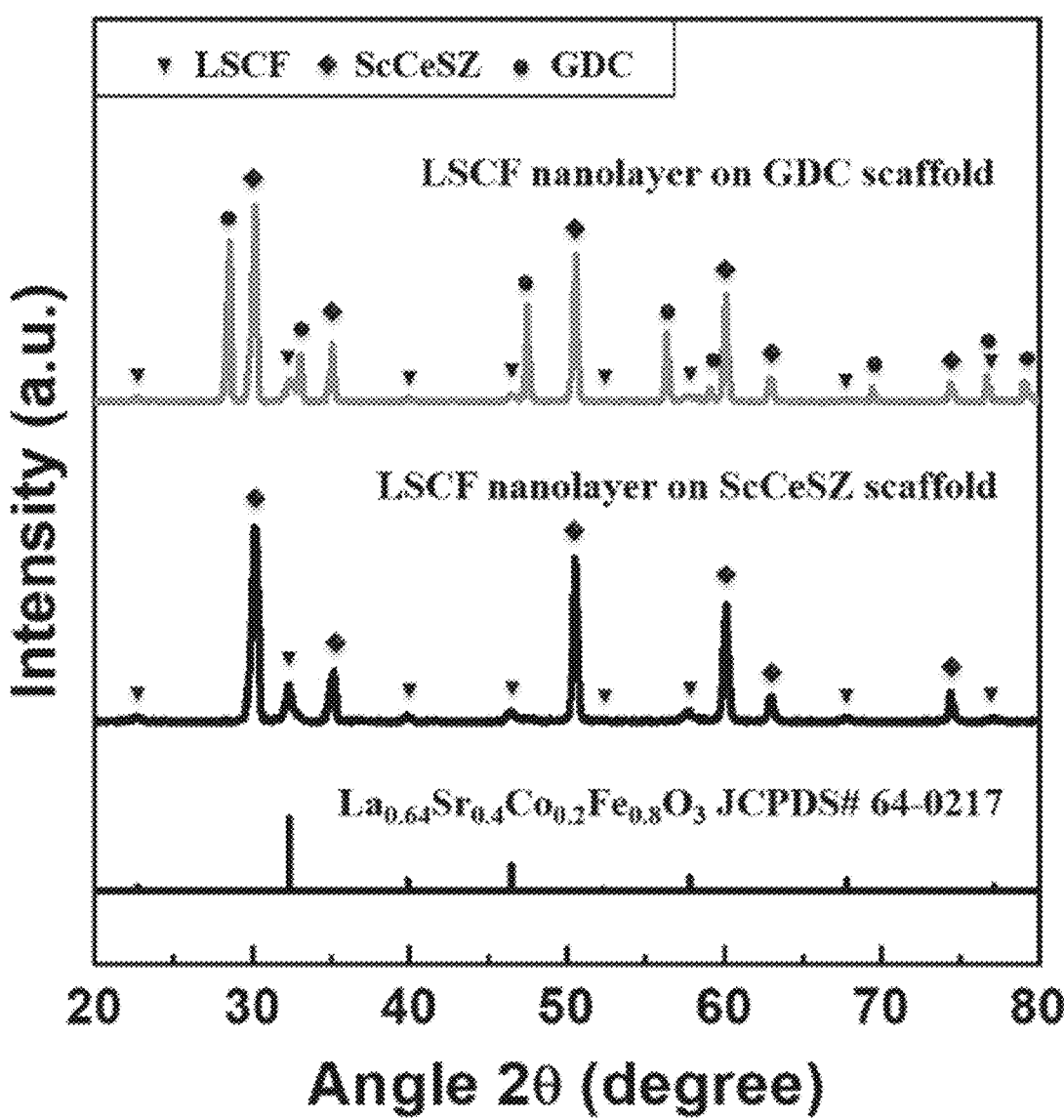
FIG. 4 shows XRD patterns of nanolayer LSCF cathodes synthesized on ScCeSZ and GDC scaffolds by performing ultrasonic spray infiltration using urea for 5 cycles.

FIG. 4 shows XRD patterns of nanolayer LSCF cathodes synthesized on ScCeSZ and GDC scaffolds by performing ultrasonic spray infiltration using urea for 5 cycles. After completion of five infiltration cycles, all samples were heat-treated at 900° C. to form the LSCF perovskite phase. The XRD data was compared with the XRD data of the standard JCPDS pattern for $La_{0.6}Sr_{0.4}Co_{0.2}Fe_{0.8}O_{3-\delta}$ (JCPDS card NO. 64-0217). The result showed that a pure LSCF phase was formed.

Experimental Example 2: SEM Analysis

Figure 5:
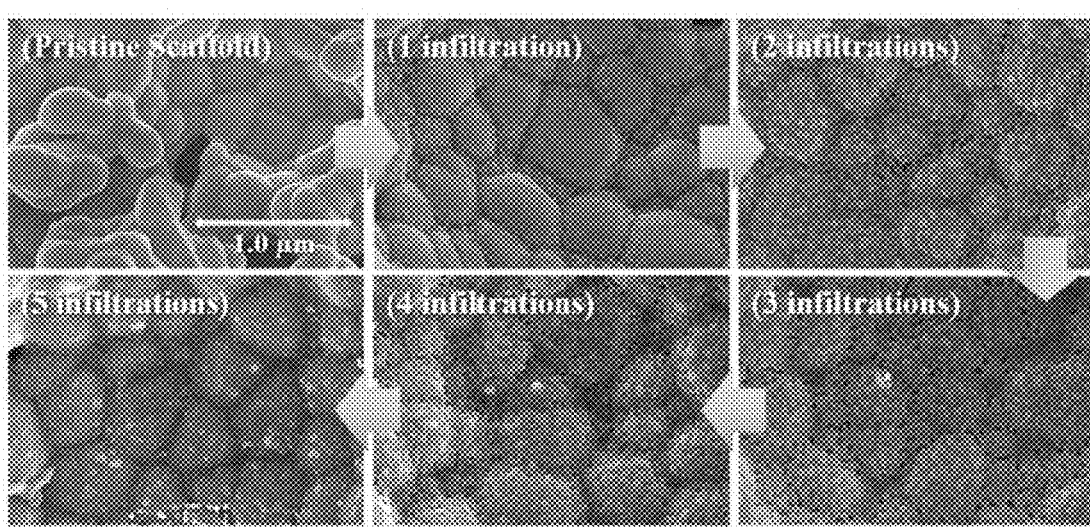
FIG. 5 is a high-resolution SEM (HRSEM) image illustrating the LSCF nanolayer formed on the ScCeSZ scaffold.

FIG. 5 is a high-resolution SEM (HRSEM) image illustrating an LSCF nanolayer formed on a ScCeSZ scaffold. SEM images of FIG. 5 are obtained after all infiltration cycles wherein the calcination was performed at 900° C. after the final infiltration cycle.

In the calcination, the metal hydroxide and hydroxy carbonate formed after drying the infiltration solution are decomposed to produce precursor metal oxide nanoparticles. LSCF nanoparticles are formed as precursor metal oxide nanoparticles at a temperature of 900° C. and are attached to the GDC or ScCeSZ scaffold via van der Waals attraction.

Referring to FIG. 5, most of the LSCF nanoparticles were formed in the region around the boundary of the ScCeSZ particles after a single infiltration cycle of ultrasonic spraying. After the second infiltration cycle, the nanoparticles at the grain boundaries began to form interconnected networks and nanoparticles also appeared on the particle surfaces. The density of LSCF nanoparticles increased even more during the third and fourth infiltration cycles. Finally, after the fifth infiltration cycle, the LSCF nanoparticles filled all the empty spaces and continuously coated the surface of the ScCeSZ particles. Thus, a uniform LSCF nanolayer was obtained after 5 cycles of ultrasonic spray infiltration using urea as well as a 1M precursor infiltration solution.

Experimental Example 3: Evaluation of SOFC Electrochemical Performance

Figure 6:
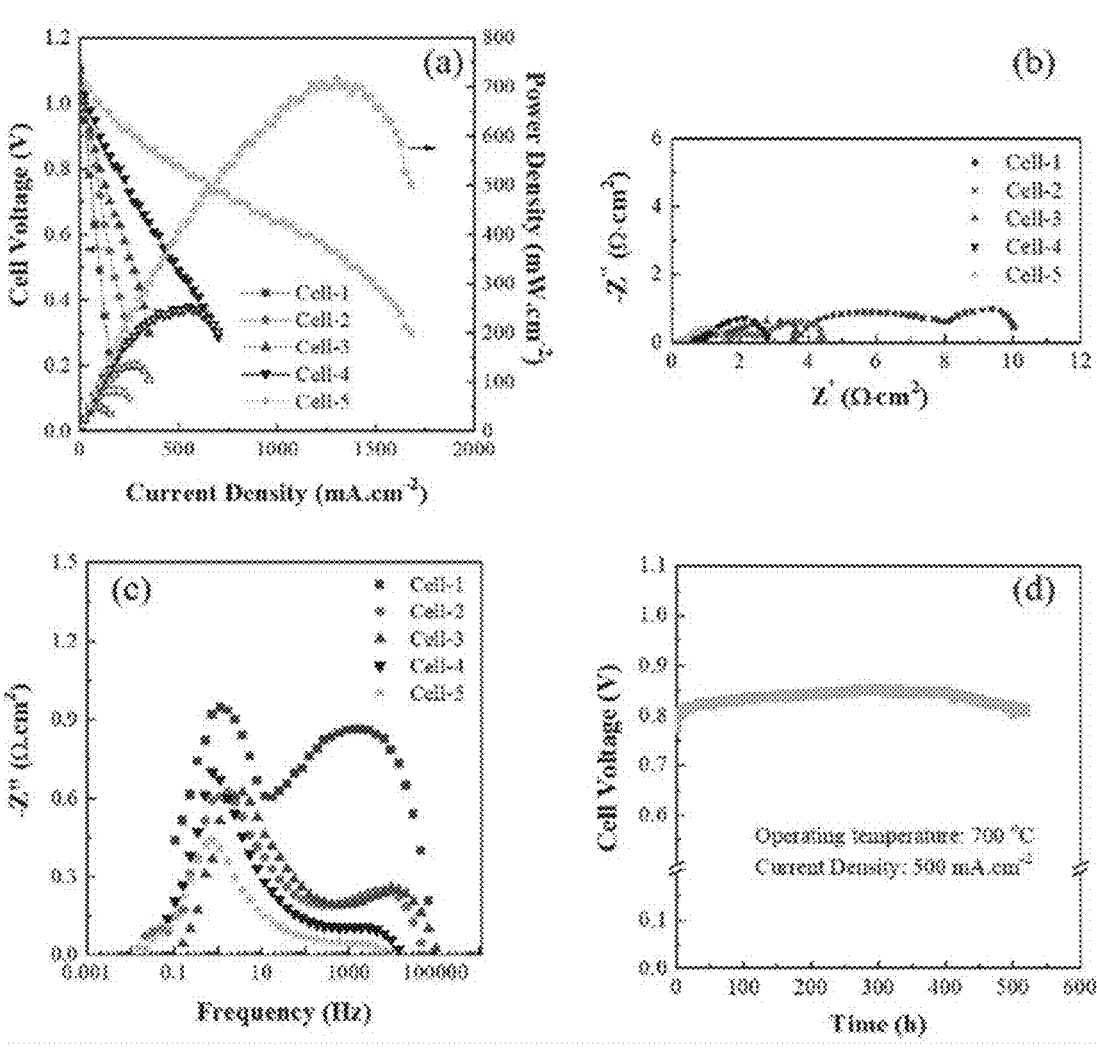
FIG. 6 shows electrochemical performance of various SOFCs, more specifically.

The electrochemical performance of the SOFC was measured at an operating temperature of 750° C. and humidified hydrogen and dry air were supplied as fuel and oxidant, respectively. FIG. 6 shows the electrochemical performance of various SOFCs.

FIG. 6A is a current-voltage (I-V) and current-power (I-P) plot of a SOFC segment according to Example. Cell-1 had a power density of 49 mW$^{-2}$ after single infiltration. As the number of ultrasonic spray infiltration cycles increased, the maximum power density of the cell continuously increased and the performance of the SOFC increased. Cell-5, which was infiltrated with LSCF through five ultrasonic spraying, had the highest power density at 710 mW cm$^{-2}$.

FIGS. 6B and 6C are graphs illustrating electrochemical impedance spectroscopy (EIS) data as Nyquist and Bode plots, respectively. Referring to FIG. 6B, Cell-1 had high ohmic (3.63 Ωcm²) and polarization (6.41 Ωcm²) resistance levels, resulting in low performance. Such high ohmic resistance is due to high contact resistance caused by improper infiltration of LSCF nanoparticles present as individual nanoparticles after a single infiltration cycle, as shown in FIG. 5 above.

Referring to FIG. 6C in relation with the polarization resistance, high-frequency arc and low-frequency arc exhibit inefficient infiltration of LSCF nanoparticles due to high charge transfer resistance and insufficient activity of oxygen reduction reaction (ORR), respectively.

As the loading amount of LSCF increased, infiltration on LSCF was strengthened and the potential active region of ORR was expanded, such that the ohmic and polarization resistance decreased rapidly. Cell-5 has high power density (710 mW·cm²), and reduced ohmic (0.16 Ω·cm²) and polarization (1.36 Ω·cm²) resistance compared to Cell-4, and thus has greatly improved performance. This indicates complete infiltration of the LSCF nanoparticles in the form of continuous nanolayers.

As can be seen from FIGS. 6B and 6C, Cell-5 had the lowest ohmic and polarization resistance and thus exhibited improved interface formation, charge transfer, and ORR characteristics.

Meanwhile, to test the durability of the SOFC that included nanolayer LSCF cathodes synthesized on the ScCeSZ scaffold and had no GDC buffer layer, Cell-5 was operated at 700° C. while a constant current of 500 mA cm$^{-2}$ was applied thereto. As a result, referring to FIG. 6D, an initial increase in performance related to cathode activation was observed. Cell-5 exhibited stable performance for ~400 hours, after which the cell voltage rapidly declined. That is, the LSCF may be vulnerable to Sr precipitation that infiltrates the ScCeSZ scaffolds and causes performance degradation.

Figure 7:
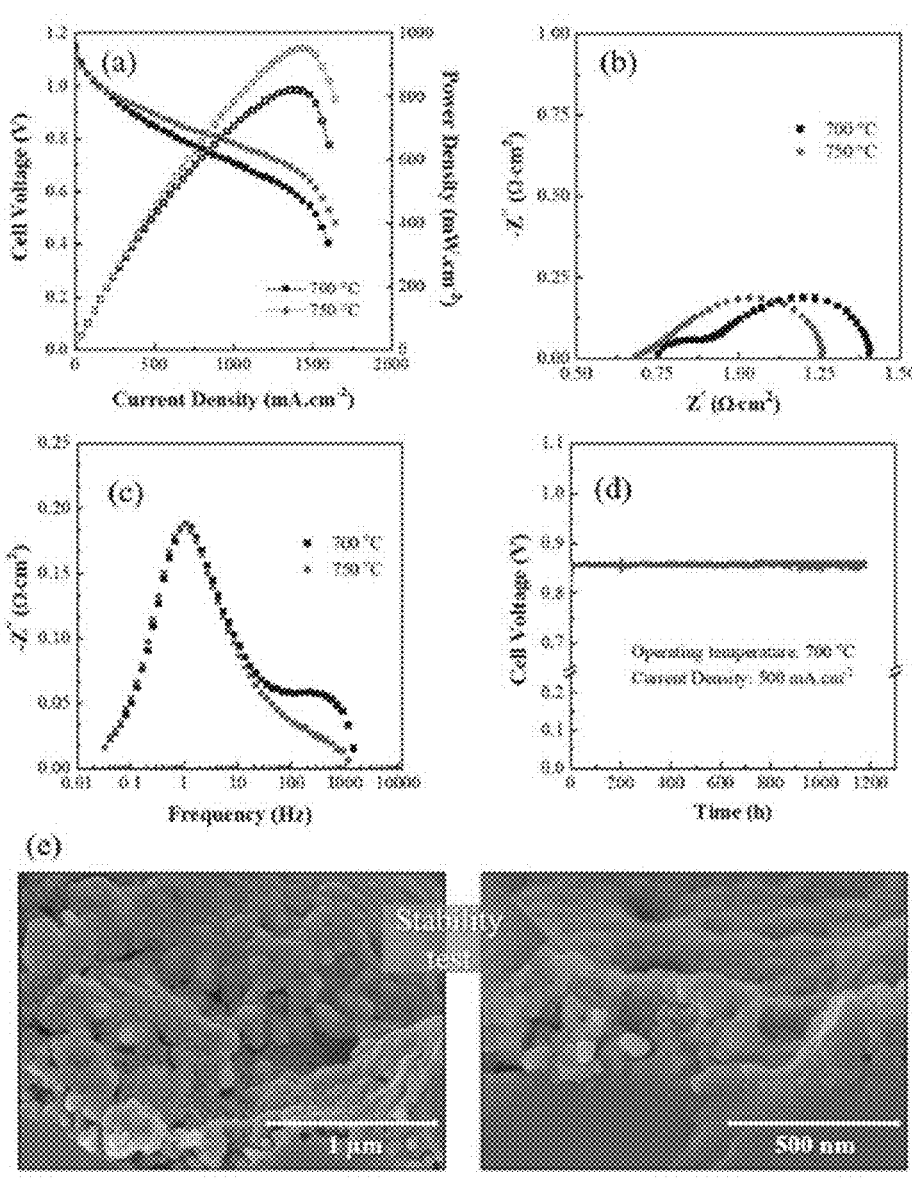
FIG. 7 shows the electrochemical performance of the SOFCs, more specifically.

Meanwhile, as described with reference to Examples and FIG. 1B above, a GDC scaffold having an area of 25 cm$^2$ was produced and then ultrasonically sprayed to produce an LSCF nanolayer cathode. Then, performance was evaluated at operating temperatures of 700 and 750° C. As shown in FIG. 7, humidified hydrogen was used as a fuel and dry air was used as an oxidant. The cell exhibited high OCV of 1.15 and 1.13V at respective temperatures, which indicates that the electrolyte and the sealant are air-tight. Maximum power densities of 820 and 953 mW·cm$^{-2}$ were observed at 700 and 750° C., respectively. The GDC scaffold exhibited higher power density due to higher conductivity and better chemical compatibility compared to the ScCeSZ scaffold.

However, as can be seen from FIG. 7A, the cell performance was limited because the SOFC voltage rapidly decreased in a high current density region having high gas concentration polarization.

Referring to FIGS. 7B and 7C, the impedance data is represented by Nyquist and Bode plots, which indicates that only the high-frequency arc is affected by the change in cell operating temperature. The high-frequency region (0.03 to 5 kHz) of the impedance data is associated with the electrode activation resistance, which means dependence on the cell operating temperature.

The low frequency region (≤10 Hz) is associated with the diffusion resistance of the anode support combined with the ORR activity of the cathode. FIGS. 7B and 7C show a high polarization resistance associated with a low frequency arc regardless of the cell operating temperature. Therefore, it can be seen that better electrochemical performance can be obtained when a nanostructured LSCF cathode is manufactured by ultrasonic spraying using urea on an anode support cell including a porous anode support.

FIG. 7D shows the result of a 1200-hour stability test of the SOFC operating at a constant current load of 500 mA cm$^{-2}$ and an operating temperature of 700° C. The performance of the cell did not degrade during the durability test. It can also be seen that replacing the ScCeSZ scaffold with the GDC scaffold played a key role in stabilizing the performance of the SOFC not including the GDC buffer layer.

FIG. 7E is an SEM image illustrating the LSCF nanolayer cathode before and after the durability test. After durability test, the LSCF slightly aggregated. However, the LSCF still formed an excellent interface with the GDC scaffold. The result showed that an anode-supported SOFC including a nanolayer LSCF cathode without the GDC buffer layer was successfully manufactured and it exhibited excellent durability.

In the method of manufacturing a cathode for a solid oxide fuel cell of the present invention, an SOFC cathode may be formed using wet infiltration using ultrasonic spraying. In this case, by using urea as a precipitating agent, calcination (≥700° C.) after each infiltration cycle can be omitted and the next infiltration cycle can be performed immediately after drying (≤100° C.). The high-temperature (≥700° C.) calcination is a time-consuming process that typically takes one day per calcination cycle in consideration of the heating rate (about 1°/min) and cooling rate (about 1°/min).

Finally, the precipitate can be converted into the desired catalytic phase through single calcination, allowing for much faster production of nanostructured cathodes. In addition, due to the low calcination temperature (≤900° C.), an SOFC having excellent durability and performance can be manufactured without using a Ce$_{0.9}$Gd$_{0.1}$O$_2$(GDC) diffusion barrier layer.

The SOFC of the present invention can operate stably even in a 1200-hour durability test.

The features, structures, effects, and the like described in the foregoing embodiments fall within the range of at least one embodiment of the present invention and are not necessarily limited to only one embodiment. Furthermore, the features, structures, effects, and the like illustrated in each embodiment may be combined or modified with respect to other embodiments by those skilled in the art in the field to which the embodiments pertain. Therefore, contents related to these combinations and variations should be construed as being included in the scope of the present invention.

Although the preferred embodiments of the present invention have been disclosed, those skilled in the art will appreciate that various modifications, additions and substitutions are possible, without departing from the scope and spirit of the invention as disclosed in the accompanying claims. Therefore, the disclosed embodiments should be considered from an illustrative point of view rather than a limiting point of view. The scope of the present invention is defined by the claims rather than the aforementioned description, and all differences falling within the scope of equivalents thereto should be construed as falling within the scope of the present invention.

What is claimed is:

1. A method of manufacturing a cathode for a solid oxide fuel cell (SOFC) comprising:
preparing an electrode composition containing urea and a precursor of La$_{0.6}$Sr$_{0.4}$Co$_{0.2}$Fe$_{0.8}$O$_3$ (LSCF),
wherein a molar ratio of urea to the precursor of La$_{0.6}$Sr$_{0.4}$Co$_{0.2}$Fe$_{0.8}$O$_3$ (LSCF) is 10:1 to 15:1;
ultrasonically spraying the electrode composition onto a gadolinium-doped ceria (GDC) scaffold; and
drying the scaffold.

2. The method according to claim 1, wherein the ultrasonically spraying comprises infiltration of the electrode composition using ultrasonic spraying.

3. The method according to claim 1, wherein the drying is performed at a temperature lower than 100° C.

4. The method according to claim 1, wherein the infiltration is performed from 3 to 5 cycles.

5. The method according to claim 4, wherein a single calcination is performed after the last infiltration cycle.

6. The method according to claim 5, wherein the single calcination is performed at ≤900° C.

7. The method according to claim 5, wherein the single calcination is performed at 800-900° C. for 2 to 3 hours.

* * * * *